(12) United States Patent
Bickle et al.

(10) Patent No.: US 6,588,248 B1
(45) Date of Patent: Jul. 8, 2003

(54) WRAPPED PLAIN BEARING BUSH

(75) Inventors: Wolfgang Bickle, Reilingen (DE); Thomas Storch, Bruhl (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 0 days.

(21) Appl. No.: 09/914,117

(22) PCT Filed: Feb. 10, 2000

(86) PCT No.: PCT/EP00/01055
§ 371 (c)(1), (2), (4) Date: Aug. 23, 2001

(87) PCT Pub. No.: WO00/50184
PCT Pub. Date: Aug. 31, 2000

(30) Foreign Application Priority Data

Feb. 23, 1999 (DE) .......................... 199 07 571

(51) Int. Cl.⁷ ............................. B21D 31/00
(52) U.S. Cl. ................... 72/379.2; 29/898.057
(58) Field of Search ............ 29/898.056, 898.057, 29/415; 72/51, 203, 379.2

(56) References Cited

U.S. PATENT DOCUMENTS

| | | | | |
|---|---|---|---|---|
| 1,602,075 A | * | 10/1926 | Hiering | 72/379.2 |
| 2,177,584 A | * | 10/1939 | Salansky | 29/898.057 |
| 2,225,269 A | | 12/1940 | Hildabolt | 29/149 |
| 2,883,738 A | * | 4/1959 | Morrow | 29/898.057 |
| 3,455,004 A | | 7/1969 | Tethal | 29/149 |
| 4,180,895 A | | 1/1980 | Spikes et al. | 29/149 |
| 4,655,615 A | | 4/1987 | Mori | 384/286 |
| 4,907,626 A | | 3/1990 | Mori | 138/156 |
| 5,216,811 A | | 6/1993 | Jackson et al. | 29/898 |

FOREIGN PATENT DOCUMENTS

| | | | |
|---|---|---|---|
| DE | 1 525 279 | 11/1969 | |
| DE | 1625626 | 7/1970 | |
| DE | 24 06 361 | 2/1974 | |
| DE | 24 06 460 | 8/1975 | |
| DE | 35 11 125 | 10/1985 | |
| DE | 39 98 026 | 9/1990 | |
| EP | 0 802 338 | 4/1997 | |
| GB | 2 026 625 | * 2/1980 | 29/898.057 |
| GB | 1 597 960 | 9/1981 | |

OTHER PUBLICATIONS

Prospekt, Spannbuchsen, Fa. Jorg Vogelsand GmbH u. Co., 1990.

Z. Schmiertechnik & Tribologie, 23. Jg., Nr. 2, 1976, Seiten 33–35.

* cited by examiner

*Primary Examiner*—Lowell A. Larson
(74) *Attorney, Agent, or Firm*—Young & Basile, PC

(57) ABSTRACT

A wrapped plain bearing bush having a bush width which varies in the peripheral direction. The bush is characterized in that it is wrapped from a strip-shaped band section which is provided with a variable over the length of the section while still in its flat state and which is wrapped in such a way that the wrapped bush does not need to be subjected to any further cutting of the width; but, instead, has its definitive, variable bush width after wrapping on the bush mold.

20 Claims, 3 Drawing Sheets

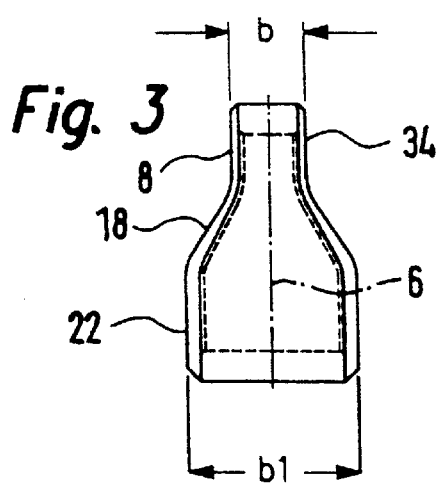
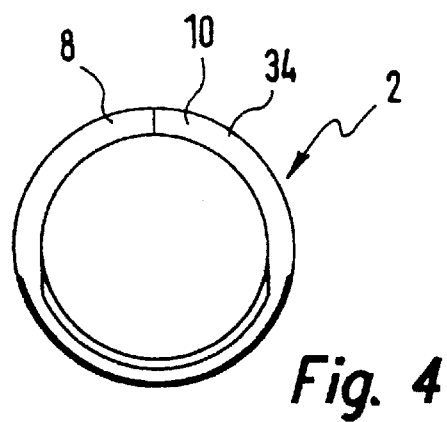
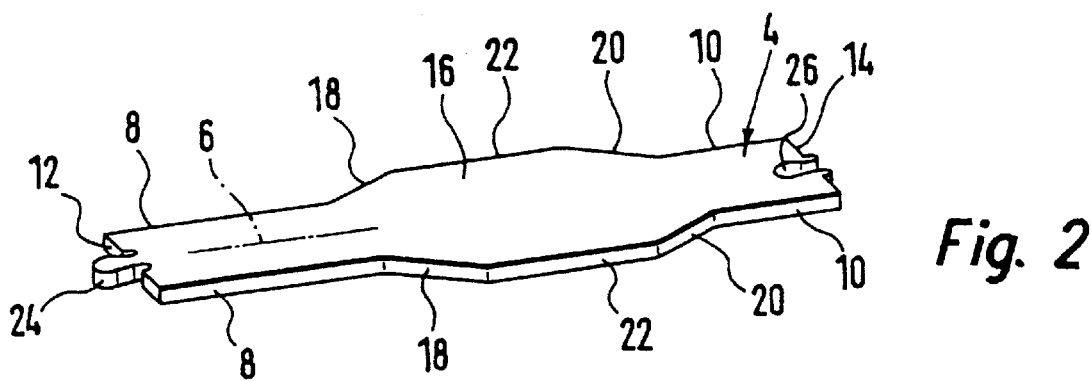
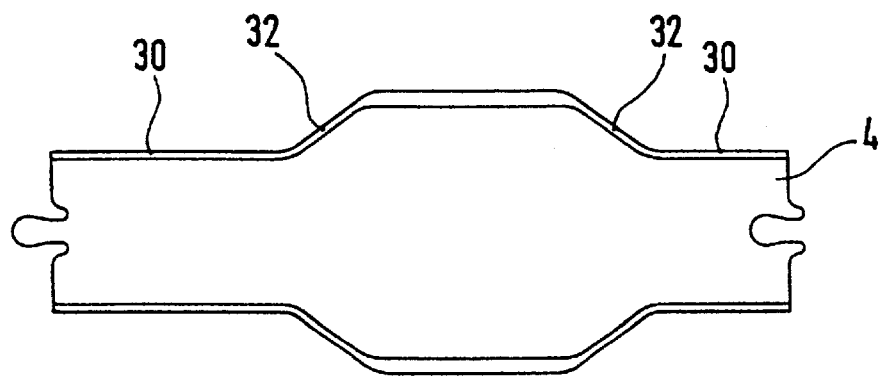

WRAPPED PLAIN BEARING BUSH

BACKGROUND

The invention relates to a process for manufacturing a rolled-up plain bearing bush having a bearing width that varies over the length of the circumference and having machined peripheral ends.

Plain bearing bushes of this type are known. Such bearing bushes are used, in particular, as connecting rod bearings in the small end of the connecting rod in combustion engines. The varying bushing width is intended to effect a weight savings as compared to the solidly pressed-in plain bearing bushing, but are also adapted to geometric constraints at the side.

Until now plain bearing bushings of this type have been rolled as cylindrical bushings out of a rectangular, ribbon-shaped section of a strip of the bearing material or compound bearing material. Then the bushing was brought to the desired shape by machining in equipment for width turning. To do this, a rotationally driveable cutting tool with an axis of rotation set at an angle to the bushing's longitudinal axis is advanced in an automated machine for width turning on one side or on both sides, so that the machined peripheral ends or peripheral end sections are lying in one plane. In this way a bushing shape described in a side view as what is known as a trapezoid can be achieved. After the so-called turning to width, the outer and/or inner bevel of the bushing ends has to be formed in a very complicated manner in additional machining involving metal removal.

Instead of equipment for turning the bushing to width, a known finished rolled cylindrical plain bearing bushing can also be machined by means of a milling cutter in such a way that it has a varying bushing width over the length of the circumference. If there should be any doubt, this process is even more complicated.

With rolled-up plain bearing bushings, punching out a relatively short rectangular recess from the material ribbon prior to the rolling procedure was also known. As a result, a bushing with varying width over the length of the circumference is certainly created, but machining of the punched out peripheral end section is not performed (see, for example, catalogue from Jorg Vogelsang GmbH & Co. from 1990, Metal Forming, page 14, Bearing Bushings).

GB-A-1 597 9604 teaches the manufacture of bushings with varying bushing width over the length of the circumference in pairs or in batches by demarcating several strips immediately adjacent to each other in the transverse direction from a single roll of flat material to produce several bushings. First, longitudinal sections are formed from several bushings next to each other in the transverse direction, which are then transferred and rolled up in the transverse direction. Only then in the rolled-up state are the bushings separated. If machining of the peripheral ends is desired, this has to take place subsequently.

Starting from this, it is desirable to create a rolled-up plain bearing bushing with a bushing width varying over the length of the circumference, which can be manufactured more economically and which has more uniformly machined peripheral ends than known bushings.

SUMMARY

The process according to the invention is characterized in that after being rolled up, the plain bearing bushing does not have to undergo any machining to its width involving cutting. It has accordingly a well defined, clean side profile which, because of its rotationally non-symmetrical geometry, could never be achieved by means of the known machining to its width through metal cutting and subsequent side machining. The person skilled in the art can recognize without any difficulty from the finished product under the invention that the varying bushing width over the length of the circumference was not produced by a machining process involving metal cutting.

The plain bearing bushing under the invention, which is manufactured from a previously formed ribbon-shaped section of strip, that is, a formed blank, has the advantage that the bushing can be produced in the rolling-bending tool being finished without subsequent machining to width.

An offset shape, specifically, a multiple offset shape for the bushing width, can be produced in a particularly advantageous way, without the need for any metal-cutting machining to width. This is understood in the mathematical sense to be a discontinuous course of the peripheral ends. But even a course of the peripheral ends which is curved in sections, i.e., one that is non-linear, can turn out to be advantageous. It was possible to produce a shape of this type previously only by machining using a milling cutter.

The invention further proves to be advantageous if the side sections of the ribbon-shaped section of strip forming the circular peripheral ends have a coined bevel at least in sections, specifically one that is not created by removing metal by machining, which is introduced while still in the planar state before the section of strip is rolled up.

According to the procedure under the invention, a ribbon-shaped continuous roll of flat material is fed in its longitudinal direction to a cutting device, in which the side shape forming the terminating circular peripheral ends is cut into the roll of flat material. What is created is a profile of varying width running in the longitudinal direction. Bevels are then created along the edges of the profiled roll of flat material, preferably by means of coining. Then the sections forming the individual bearing bushings are separated from the continuous roll of flat material. These strip sections are then rolled up into the bushing shape to form the finished free-falling bearing bushing.

Preferably after cutting the side shape and before separating and rolling up the sections of the strip, each of the longitudinal sides is given an edge, profile rolled, and, if necessary, chased. In the same way, preferably before rolling up the strip sections, an oil groove and/or lubricating holes can be coined or stamped. After the bushings are rolled up, only a ball-sizing calibration and an outside draw calibration need to be performed.

BRIEF DESCRIPTION OF THE DRAWING

Additional features, details and advantages of the invention can be derived from the attached patent claims, for whose features protection is sought for each one taken individually. A preferred embodiment of the present invention is described in the ensuing with reference to the attached drawing. In the drawing:

FIG. 1 shows a plan view of a strip section in a flat state before rolling up a bearing bushing in accordance with the invention;

FIG. 2 shows a perspective view according to FIG. 1;

FIG. 3 shows a side view of the bearing bushing rolled up from the section of strip according to FIGS. 1 and 2;

FIG. 4 shows an end view of the bearing bushing according to FIG. 3;

DETAILED DESCRIPTION

Figure 7:
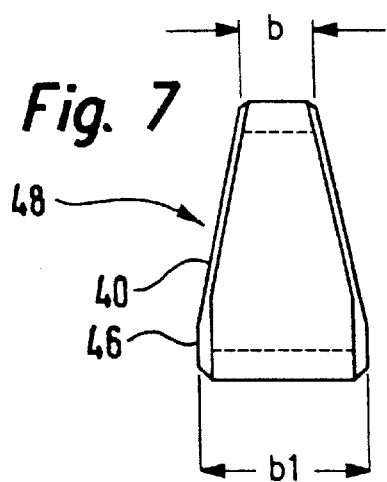
FIG. 5 to 8 show views of an additional embodiment of the bearing bushing according to the invention, similar to FIGS. 1 to 4.
Figure 8:
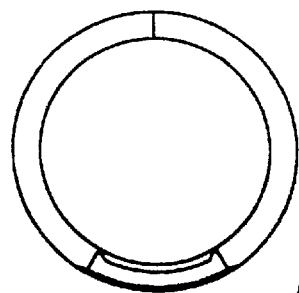
Figure 6:
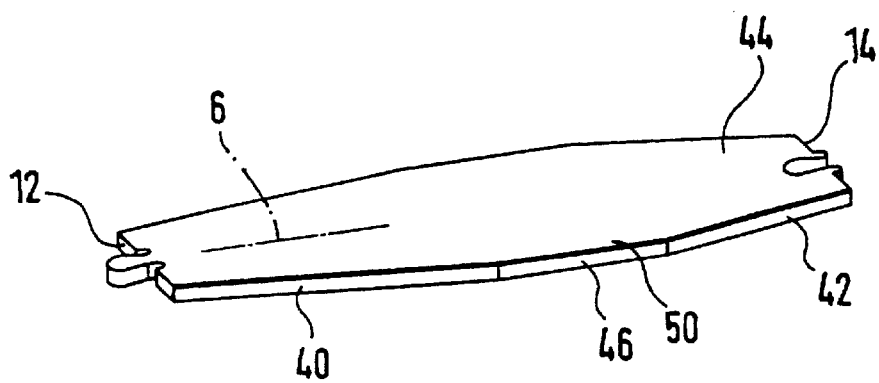
Figure 5:
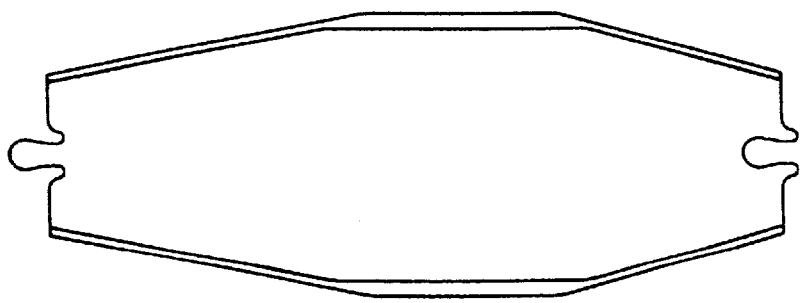

FIGS. 1 to 4 show an initial embodiment of a bearing bushing according to the invention, which is identified overall by reference numeral 2. The bearing bushing 2 is manufactured from a ribbon-shaped section of strip 4 of a composite metallic bearing bushing material. The section of strip 4 is cut from a continuous roll of flat material creating a formed blank and exhibits a varying width. On both sides the section of strip 4 comprises two side sections 8, 10 running parallel to the longitudinal direction 6 and in alignment with each other, which on one side lead to the ends 12, 14 of the section of strip 4 and, on the other side, transition into two side sections 18, 20 running to the outside at an angle to the longitudinal direction which delineate a broader section 16. These angled side sections 18, 20 are connected by a parallel side section 22, in turn running parallel to the longitudinal direction 6.

A tongue-shaped projection 24 and a matching recess 26 is formed on the ends 12, 14 of the section 4 abutting each other in the load impact area.

The side sections 22 running parallel to the longitudinal direction 6, delineating the broader section 16, have a bevel, which was introduced by chasing before cutting in the remaining side sections 8, 10 and 18, 20 from the continuous roll.

In the case of the remaining side sections 8, 10 and 18, 20, a bevel 30, 32, respectively, was formed by coining, that is, without metal removal, after the profile shape was cut. The side sections 8, 10 and 18, 20 could also have a bevel formed by coining without metal cutting. The side sections 8, 10 and 18, 20 can be given a bevel on the inside on the running surface and/or on the outside on the backing.

FIGS. 3 and 4 show two views of the rolled up bushing 2. The varying width b over the length of the circumference can be seen. The circular peripheral ends 34 in the view of FIG. 4 are formed symmetrically to the longitudinal line 6 in the embodiment depicted here.

The bushing width defined in the load impact area by the side sections 8, 10 is b1, and the width of the bushing defined by the side sections 20,22 is (b). Between the side sections 8, 10 and 20, 22, the peripheral ends 34 are offset twice, more precisely, at the transition of the side section 8 to the side section 18 and from there once more to the side sections 20,22.

FIGS. 5 to 8 show an embodiment of a bearing bushing according to the invention, similar to FIGS. 1 to 4, whose side sections 40, 42 terminating in the load impact area at the ends 12, 14, run at an angle to the longitudinal direction 6 of the ribbon-shaped section 44. At its other end the straight side sections 40, 42 transition into a side section 44 running parallel to the longitudinal direction 6. The side sections 40, 42, 44 are machined as described in connection with FIGS. 1 to 4.

The bearing bushing 48 rolled up from this section of strip 44 is offset once, to be precise, at the transition of the side section 46, which delineates a broader area 50, to the side sections 40, 42.

The bushing width varies then between a width b defined by the distance between the side sections 46 on both sides and a width b1 defined by the distance of the side sections 40, 42 to the ends 12, 14.

Figure 9:
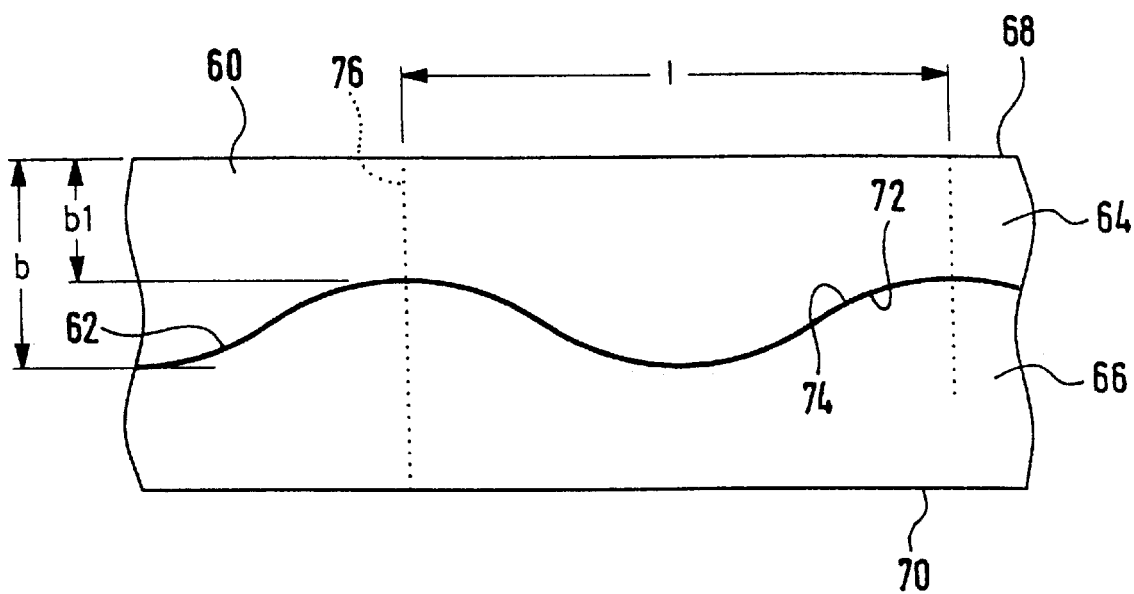
FIG. 9 shows a schematic representation of a ribbon-shaped continuous roll of flat material with a suggested cut line to create two strips.

Finally, FIG. 9 shows a schematic representation of a continuous bearing material 60 as a roll of flats. The suggested arcuate line 62 identifies a cut to create two continuous strips 64, 66 having, on one side, a straight side run 68, 70 and, on the other side, an arcuate side run 72, 74. If sections of length 1 are separated from this continuous roll, rolled up bearing bushings having a bushing width varying between b and b1 over the length of the circumference can be produced, where, with the suggested positioning of the cut line 76, the load impact area of the rolled bearing bushing has the smaller bushing width b1.

The advantage of this embodiment is that no waste of any kind is generated by the cut. It is obvious that bearing bushes in accordance with FIGS. 1 to 8 can also be produced from two or several continuous strips cut in the longitudinal direction from a continuous roll.

What is claimed is:

1. A process for manufacturing a rolled-up plain bearing bushing from a ribbon-shaped continuous roll of flat material, having a bushing width which varies over the length of the circumference, comprising the sequential steps of:
   cutting a side shape from a ribbon-shaped continuous roll of flat material, so that a profile of varying width is formed, running in the longitudinal direction of the roll of flat material and defining at least one substantially straight side section running to the outside at an angle to the longitudinal direction of the continuous roll of flat material;
   creating continuous bevels along the edges of the roll of flat material running in the longitudinal direction of the roll of flat material;
   separating strip sections from the continuous roll of flat material;
   rolling up each strip section into a bushing shape; and
   obtaining a finished falling plain bushing bearing which does not need any additional machining to the width after being rolled up into a bushing shape, but exhibits its final varying bushing width.

2. The process in accordance with claim 1, further comprising the steps of forming a multiple offset of the peripheral ends delineating the bushing width during the cutting of the side shape.

3. The process in accordance with claim 1, further comprising the steps of forming two side sections, running parallel to the longitudinal direction of the strip section and in alignment with each other, and forming two side sections running to the outside at an angle to the longitudinal direction and delineating a broader section and forming one side section parallel to the longitudinal direction and connecting the angled side sections to each other.

4. The process in accordance with claim 1, while still in the planar state, starting from a load impact joint, forming two side sections, running to the outside at an angle to the longitudinal direction, and one side section is formed, running parallel to the longitudinal direction connecting the angled side sections to each other.

5. The process in accordance with claim 1, further comprising forming a tongue-like projection and a matching recess which can engage the projection in the load impact area of the ends of the ribbon-shaped section of strip from which the bushing is rolled up, which ends are at least almost abutting.

6. The process in accordance with claim 5, wherein the forming step further comprises the step of:

forming the tongue-like projection centered along a longitudinal line of the strip section.

7. The process in accordance with claim 1, further comprising the step of coining the bevels at least in sections.

8. The process in accordance with claim 1, further comprising the steps of, prior to cutting the side shape and prior to separating the strip sections, edging, profile rolling, and chasing the longitudinal sides of the continuous roll of flat material.

9. The process in accordance with claim 1, further comprising the steps of, prior to rolling the sections of strip, coining an oil groove and forming lubricating holes.

10. The process in accordance with claim 1, further comprising the step of, after the strip sections are rolled up into the bushing shape, performing a ball-sizing calibration.

11. The process in accordance with claim 1, further comprising the step of, after rolling up the bushing, performing an outside draw calibration.

12. The process in accordance with claim 1, further comprising the step of cutting several continuous strips of flat material of lesser width, and varying in width in the longitudinal direction from one continuous roll of flat material of a primary width.

13. The process in accordance with claim 1, wherein the creating step is performed after the cutting step.

14. The process in accordance with claim 1, wherein the creating step is performed before the separating step.

15. The process in accordance with claim 1, wherein the creating step further comprises the step of:

forming a first bevel along a portion of the ribbon shaped continuous roll by chasing before the cutting step.

16. The process in accordance with claim 15, wherein the creating step further comprises the step of:

forming at least a second bevel along a portion of the side shape by coining, the portion of the side shape formed in the cutting step.

17. A process for manufacturing a rolled-up plain bearing bushing from a ribbon-shaped continuous roll of flat material, having a bushing width which varies over the length of the circumference, comprising the step of:

cutting a side shape from a ribbon-shaped continuous roll of flat material, so that a profile of varying width is formed, running in the longitudinal direction of the roll of flat material and defining at least one substantially straight side section running to the outside at an angle to the longitudinal direction of the continuous roll of flat material.

18. The process in accordance with claim 17, further comprising the step of:

introducing a bevel along a portion of the ribbon-shaped continuous roll of flat material before the cutting step.

19. The process in accordance with claim 18, further comprising the step of:

forming a bevel along a second portion of the ribbon-shaped continuous roll of flat material after the cutting step.

20. The process in accordance with claim 19, further comprising the step of:

separating strip sections from the continuous roll of flat material after the forming step.

* * * * *